United States Patent
Rambacher et al.

[11] 3,879,534
[45] Apr. 22, 1975

[54] METHOD FOR TREATING DANDRUFF

[75] Inventors: Paul Rambacher, Rosenheim; Siegfried Make, Kirchdorf, Inn, both of Germany

[73] Assignee: Diamalt Aktiengesellschaft, Munich, Germany

[22] Filed: July 17, 1972

[21] Appl. No.: 272,718

[30] Foreign Application Priority Data
July 30, 1971 Germany............................ 2138225

[52] U.S. Cl. ............. 424/273; 424/DIG. 4; 424/70; 424/74
[51] Int. Cl............................................. A01n 9/22
[58] Field of Search................. 424/DIG. 4, 273, 70

[56] References Cited
OTHER PUBLICATIONS
Businger, Chemical Abstracts, 1947, Vol. 41, pp. 3790 to 3792.

Harry, Modern Cosmeticology, 1955, Vol. I, pp. 380 to 382.

*Primary Examiner*—Stanley J. Friedman
*Assistant Examiner*—Dale R. Ore

[57] ABSTRACT

Hydantoin derivatives having the formula

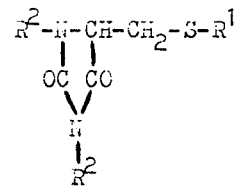

wherein R¹ is a carboxy-loweralkyl group and R² is hydrogen or an alkyl group having 1 to 5 carbon atoms are effective in controlling scalp dandruff.

3 Claims, No Drawings

METHOD FOR TREATING DANDRUFF

The invention relates to hydantoin derivatives having the general formula

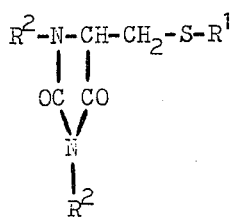

wherein $R^1$ is a carboxy-loweralkyl group and $R^2$ is hydrogen or an alkyl group having 1 to 5 carbon atoms. Preferably, $R^1$ is carboxymethyl or carboxyethyl.

The hydantoin derivatives according to the invention have an antiseborrhoic activity.

It has long been known that the pathologically increased formation of scalp dandruff can be successfully treated with compounds containing thiol groups. This method was significantly improved when masked thiols were employed, as, for instance, S-substituted cysteines or cysteamines (Dutch Pat. No. 6,500,849) or thiazolidine derivatives (German Pat. No. 1,149,885), which have a pronouncedly higher oxidation stability when compared with the free thiols. In order to develop their activity, these thioethers must decompose into compounds containing thiol groups.

Surprisingly and unexpectedly, it has been discovered, that thioethers, which are connected by means of an alkylene bridge to cyclic molecular groups of the hydantoin type, are evidently susceptible to an especially easy decomposition reaction, and, consequently, have an excellent antiseborrhoic activity.

The hydantoin derivatives according to the invention can be produced in accordance with the per se known methods, for instance, by reaction of a corresponding 5-mercaptomethyl hydantoin with a halogenated carboxylic acid.

Typical compounds according to the invention are:
5-(carboxymethylthiomethyl) hydantoin
5-(carboxyethylthiomethyl)-hydantoin
1,3-dimethyl-5-(carboxymethylthiomethyl)-hydantoin
1-methyl-3-isopropyl-5-(carboxymethylthiomethyl)-hydantoin
1-ethyl-5-(carboxyethylthiomethyl)-hydantoin The invention also relates to antiseborrhoically active compositions, as, for example, hair lotions, tonics etc., which comprise an inert carrier and a hydantoin derivative according to the invention as the active ingredient. The amount of the hydantoin derivative according to the invention in such compositions, as, for example, hair lotion, is, in general, 0.5–6, preferably 1-4 weight %.

EXAMPLE 1

164 g of 5-mercaptomethyl hydantoin is suspended in 500 ml of water and 1 ml of a Trilon-B solution is added. The mixture is put under a nitrogen atmosphere and 120 g of the sodium salt of chloroacetic acid is added. The pH value of the solution is adjusted to 8 by dropwise addition of a solution of approximately 40 g of sodium hydroxide in 100 ml of water. The solution is clarified with active carbon, the filtrate is acidified with 100 ml of concentrated hydrochloric acid and the hydantoin derivative is allowed to crystallize in the cold. After separation, brief washing and drying, 116 g of 5-(carboxymethylthiomethyl) hydantoin are obtained (corresp. to 57% of the theoretical amount). Analysis : found N :13.8 % (calc. 13.73 %) equivalent weight : 207.5 (calc. 204)

EXAMPLE 2

The following table demonstrates the effect of a 2% solution of the 5-(carboxymethylthiomethyl)-hydantoin of Example 1 in 60% ethanol against scalp dandruff and scaly scalp eczema in a test conducted with 100 persons, in comparison with 60% ethanol alone.

Table

| Hair lotion | Number of tested persons | Dandruff absence during the treatment after days | | | | | | no effect | Dandruff absence after termination of the treatment after weeks | | |
|---|---|---|---|---|---|---|---|---|---|---|---|
| | | 3 | 5 | 7 | 14 | 21 | 28 | | 1 | 2 | 3 |
| 2% "Hydantoin" solution in 60% ethanol | 100 | 9 | 18 | 42 | 63 | 79 | 81 | 19 | 75 | 51 | 26 |
| 60% ethanol | 100 | 8 | 12 | 32 | 45 | 62 | 62 | 38 | 31 | 12 | 2 |

No allergic reaction to the tested active hair lotion could be established.

EXAMPLE 3

A hair lotion was formulated consisting of the following ingredients:

| | | |
|---|---|---|
| Ethanol (60%) | 90.5 | pbw |
| Camellia flower extract | 5 | pbw |
| Glycerol | 2 | pbw |
| 5-(Carboxymethylthiomethyl)-hydantoin | 2 | pbw |
| Concentrated odorant | 0.5 | pbw |

Trilon B is a trademark for a 33% by weight solution of the tetrasodium salt of ethylene-diamine-tetraacetic-acid.

We claim:

1. A method for treating dandruff which comprises applying to the scalp a composition containing a therapeutically effective amount of a hydantoin having the formula

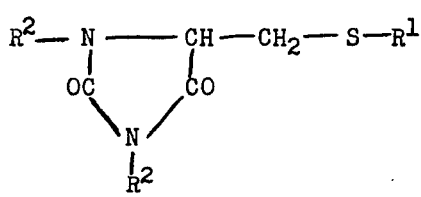

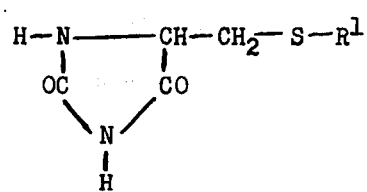

wherein $R^1$ is carboxymethyl or carboxyethyl.

3. A method according to claim 2 wherein the composition is in the form of a lotion consisting of the following ingredients in the specified proportions:

wherein
 $R^1$ is carboxymethyl or carboxyethyl, and
 $R^2$ is hydrogen or alkyl having from 1 to 5 carbon atoms.

2. A method according to claim 1 wherein the hydantoin has the formula

| Ethanol (60%) | 90.5 | parts by weight |
| Camellia flower extract | 5 | parts by weight |
| Glycerol | 2 | parts by weight |
| 5-(Carboxymethylthiomethyl)-hydantoin | 2 | parts by weight |
| Concentrated odorant | 0.5 | parts by weight. |

* * * * *